(12) United States Patent
Janson et al.

(10) Patent No.: US 10,392,271 B2
(45) Date of Patent: Aug. 27, 2019

(54) METHOD OF REMOVING HYDROGEN-SULFIDE FROM WATER

(71) Applicant: CONOCOPHILLIPS COMPANY, Houston, TX (US)

(72) Inventors: Arnold Janson, Doha (QA); Samir Gharfeh, Katy, TX (US); Samer Adham, Doha (QA); Zaid Chowdhury, Chandler, AZ (US); Joel Minier-Matar, Doha (QA)

(73) Assignee: CONOCOPHILLIPS COMPANY, Houston, TX (US)

( * ) Notice: Subject to any disclaimer, the term of this patent is extended or adjusted under 35 U.S.C. 154(b) by 194 days.

(21) Appl. No.: 15/171,429

(22) Filed: Jun. 2, 2016

(65) Prior Publication Data

US 2016/0355414 A1 Dec. 8, 2016

Related U.S. Application Data

(60) Provisional application No. 62/169,649, filed on Jun. 2, 2015.

(51) Int. Cl.
*C02F 1/44* (2006.01)
*C02F 1/66* (2006.01)
(Continued)

(52) U.S. Cl.
CPC ............ *C02F 1/448* (2013.01); *B01D 61/243* (2013.01); *B01D 61/246* (2013.01); *C02F 1/44* (2013.01);
(Continued)

(58) Field of Classification Search
CPC .. C02F 1/448; C02F 1/66; C02F 1/722; C02F 2101/40; C02F 2101/16; C02F 2101/101;
(Continued)

(56) References Cited

U.S. PATENT DOCUMENTS 4,547,293 A * 10/1985 King ................... B01D 19/0005
210/638
4,575,455 A * 3/1986 Miller ................ B01D 53/1493
252/189

(Continued)

OTHER PUBLICATIONS

Stanojević et al. Review of membrane contactors designs and application of different modules in industry. FME Transactions (2003) 31, 91-98. (Year: 2003).*

(Continued)

*Primary Examiner* — Katherine Zalasky
(74) *Attorney, Agent, or Firm* — ConocoPhillips Company

(57) ABSTRACT

A method for removing hydrogen sulfide from a liquid stream is described. The method includes contacting the liquid stream including a first amount of hydrogen sulfide with a first side of a porous gas-liquid separation membrane. The hydrogen sulfide moves through the pores of the membrane from the first side to a second, opposite side of the membrane. The method further includes contacting a receiving fluid with the second, opposite side of the porous membrane to receive the hydrogen sulfide. The liquid stream is thus converted to a reduced-sulfide liquid stream having a second amount of hydrogen sulfide that is less than the first amount of hydrogen sulfide. A method for removing ammonia from a liquid stream is also described.

16 Claims, 3 Drawing Sheets

(51) Int. Cl.
*C02F 101/16* (2006.01)
*C02F 101/10* (2006.01)
*B01D 61/24* (2006.01)
*C02F 1/72* (2006.01)
*C02F 103/36* (2006.01)
*C02F 11/122* (2019.01)
*C02F 103/06* (2006.01)

(52) U.S. Cl.
CPC ...... *B01D 2311/04* (2013.01); *B01D 2311/13* (2013.01); *B01D 2311/18* (2013.01); *C02F 1/66* (2013.01); *C02F 1/722* (2013.01); *C02F 11/122* (2013.01); *C02F 2101/101* (2013.01); *C02F 2101/16* (2013.01); *C02F 2103/06* (2013.01); *C02F 2103/365* (2013.01)

(58) Field of Classification Search
CPC ........... C02F 2103/36; C02F 2103/365; B01D 61/243; B01D 61/246; B01D 61/36; B01D 61/362; B01D 61/58; B01D 2313/24; B01D 2313/26; B01D 2311/04; B01D 2311/13; B01D 2311/18; B01D 2311/06; B01D 2311/25
See application file for complete search history.

(56) References Cited

U.S. PATENT DOCUMENTS

| | | | | |
|---|---|---|---|---|
| 4,585,630 A * | 4/1986 | Kent | ............... | B01D 53/1462 423/220 |
| 4,789,468 A * | 12/1988 | Sirkar | ............... | B01D 11/0415 210/137 |
| 4,897,091 A * | 1/1990 | Pasternak | ......... | B01D 19/0031 210/500.37 |
| 4,944,882 A * | 7/1990 | Ray | ................. | B01D 61/58 210/640 |
| 4,997,569 A | 3/1991 | Sirkar | | |
| 5,510,035 A * | 4/1996 | Toronen | ............ | D21C 11/0078 162/30.11 |
| 5,622,681 A * | 4/1997 | Grierson | ........... | B01D 53/1425 210/638 |
| 5,695,702 A * | 12/1997 | Niermeyer | ............ | B01D 63/02 156/187 |
| 5,907,066 A * | 5/1999 | Wachs | ............... | B01D 53/8668 162/16 |
| 5,911,853 A * | 6/1999 | Borrel | ................ | D21C 11/127 162/15 |
| 6,075,073 A * | 6/2000 | McGlothlin | ............... | C08J 3/07 210/637 |
| 6,306,357 B1 * | 10/2001 | Simonson | .......... | B01D 53/1462 162/51 |
| 7,897,133 B1 | 3/2011 | Hojjatie et al. | | |
| 9,005,333 B1 | 4/2015 | Vanotti et al. | | |
| 2005/0238556 A1 * | 10/2005 | Pakulski | ............. | B01D 53/485 423/228 |
| 2006/0016751 A1 * | 1/2006 | Ali | ........................ | B01D 61/022 210/644 |
| 2007/0256969 A1 * | 11/2007 | Ding | ...................... | B01D 69/12 210/490 |
| 2010/0122784 A1 * | 5/2010 | Jemaa | ................... | B01D 61/246 162/14 |
| 2012/0118804 A1 * | 5/2012 | Matza | ...................... | B01J 20/06 210/195.1 |
| 2012/0247337 A1 * | 10/2012 | Taylor | ................. | B01D 19/0031 96/6 |
| 2015/0129477 A1 * | 5/2015 | Jones | ........................ | C02F 1/24 210/202 |

OTHER PUBLICATIONS

Rava, E. Management of hydrogen sulphide generation at a Kraft paper mill. University of Pretoria (2008) 1-64. (Year: 2008).*
International Search Report for parent case, App. No. PCT/US2016/035486, dated Oct. 20, 2016.
Rakesh Govind, "Novel membrane Technology for Degassing Boiler Feed Water" LCP Tech, (Oct. 2005).
Xie, Z., et al—"Ammonia Removal by Sweep Gas Membrane Distillation," 2009, Water Research, Elsevier, Amsterdam, NL, vol. 43, Issue No. 6, pp. 1693-1699; 7 pgs.
Norddahl, B., et al—"A Membrane Contactor for Ammonia Stripping, Pilot Scale Experience and Modeling", 2006, Desalination, Elsevier, Amsterdam, NL, vol. 199, Issue No. 1-3, pp. 172-174; 3 pgs.
"Thiopaq O&G Desulphurisation: The Power of Nature", 2011, Paqell Brochure, 2 pgs.
Arthur, J. Daniel, et al—Technical Summary of Oil & Gas Produced Water Treatment Technologies, Mar. 2005, All Consulting, LLC; 53 pgs.
Macklin, S.H., et al—"Carbon dioxide and dissolved oxygen removal from makeup water by gas transfer membranes", 2010, Suez, Water Technologies & Solutions Technical Paper; 7 pgs.

* cited by examiner

METHOD OF REMOVING HYDROGEN-SULFIDE FROM WATER

CROSS REFERENCE TO RELATED APPLICATIONS

This application is a non-provisional application which claims benefit under 35 USC § 119(e) to U.S. Provisional Application Ser. No. 62/169,649 filed Jun. 2, 2015, entitled "METHOD OF REMOVING HYDROGEN SULFIDE FROM WATER," which is incorporated herein in its entirety.

BACKGROUND OF THE INVENTION

Water that contains hydrogen sulfide is commonly referred to as sour water. Sour water can arise from a number of different industrial processes as well as occur naturally in some water sources, such as wells. Besides the smell and effect on the taste of the water, hydrogen sulfide can cause corrosion and can have a number of environmental and health effects. It would be desirable to be able to use well water in many drilling and fracturing operations in hydrocarbon formations. However, some well water contains significant amounts of hydrogen sulfide, which leads to corrosion problems and the like. The corrosiveness, malodorousness, and other deleterious properties of hydrogen sulfide make it desirable, and usually necessary, to remove this compound from streams containing it in some stage of processing. The treatment of such water is also necessary before discharging it to the environment to reduce the hydrogen sulfide content to acceptable levels.

There are several recognized ways of reducing or removing hydrogen sulfide from sour water. For example, current practices generally require use of a vessel with either direct steam injection or a reboiler and a condenser, known as a sour water stripper. The sour water is supplied to the stripper, and two effluent streams are discharged: a stripped sour water stream, and sour water offgas. The sour water offgas, which contains hydrogen sulfide, is commonly sent to a reactor to convert hydrogen sulfide to non-toxic elemental sulfur (e.g., a Claus unit). A conventional sour water stripper design for hydrogen sulfide removal is depicted in FIG. 1 including a sour water stripper (1) and a Claus unit (2). A sour water stream (3) and steam (4) are injected to a stripper vessel (5). Stripped sour water (6) is removed at the bottom of the stripper vessel, and a mixture of hydrogen sulfide and steam (7) are removed from the top of the stripper vessel, and supplied to a condenser (8), cooled by a cooling water supply (9). The cooling water can be recycled by a cooling water return feature (10). Condensed water (11) can be returned to the stripper vessel. Hydrogen sulfide gas (12) exits the condenser and is transferred to a furnace (13) heated to 1000 to 1400° C. An air stream (14) is also supplied to the furnace. The hydrogen sulfide gas then enters a Claus unit comprising multiple catalytic sections (15) and separators (16) which can produce elemental sulfur (17).

The process utilizing a conventional sour water stripper has several disadvantages associated with its use, for example, significant amounts of energy are required to produce the steam necessary to strip the hydrogen sulfide. Additionally, significant amounts of cooling water are necessary to condense the steam and produce the hydrogen sulfide-containing off gas stream. In constructing the stripper and other necessary equipment, care must be taken in choosing appropriate materials because of the corrosiveness of the hydrogen sulfide, as well as the elevated temperatures required.

There remains a continuing need for an improved method to remove hydrogen sulfide from sour water that overcomes the above-described technical limitations.

SUMMARY OF THE INVENTION

A method for removing hydrogen sulfide from a liquid stream is disclosed herein. The method comprises contacting a first side of a porous, gas-liquid separation membrane with a liquid stream comprising a first amount of hydrogen sulfide; and contacting a second, opposite side of the separation membrane with a receiving fluid having a lower concentration of hydrogen sulfide than the liquid stream, wherein the hydrogen sulfide moves through the pores of the membrane from the first side to the second side, to provide a reduced-sulfide liquid stream having a second amount of hydrogen sulfide that is less than the first amount of hydrogen sulfide in the liquid stream.

The above described and other features are exemplified by the following Figures and Detailed Description.

DETAILED DESCRIPTION OF THE INVENTION

Figure 1:
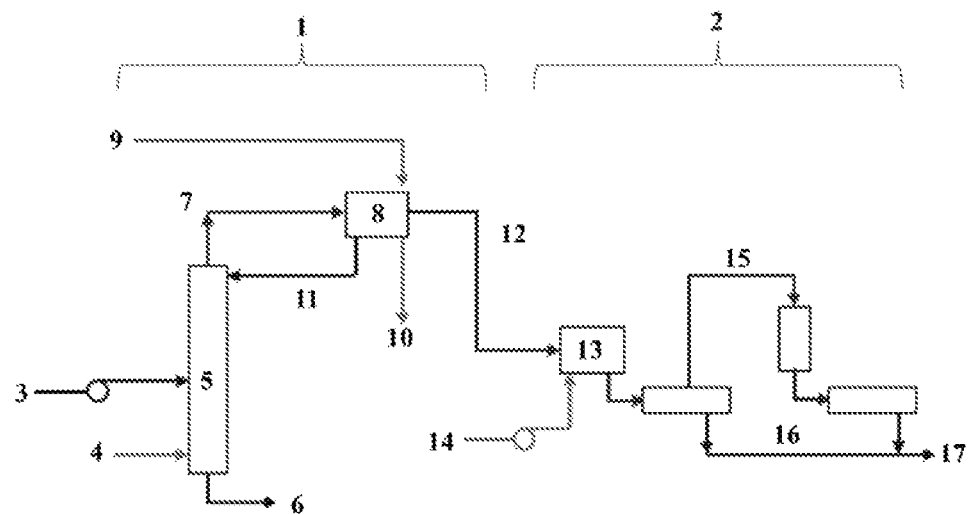
FIG. 1 shows a schematic representation of a prior art design for hydrogen sulfide removal with a sour water stripper (1) and a Claus unit (2).

The inventors hereof have discovered that porous, gas-liquid separation membranes can be of use in providing an improved method for hydrogen sulfide removal from sour water. Advantageously, no external heat is required, thus providing significant advantages relating to energy requirements. The method further provides a process for converting hydrogen sulfide into a non-hazardous aqueous or solid form, with no intermediate toxic hydrogen sulfide gas produced. The process is also easily scalable since the membranes are modular. Additionally, the treated sour water can advantageously be recycled, for example in oil and gas operations. The process can also be used for well water treatment to produce drinking water.

Without being bound by theory, it is generally necessary for hydrogen sulfide to contact a water-vapor interface to be removed from a produced water stream, for example, an interface between the produced water and air, steam, methane, and the like. Thus efficiency of hydrogen sulfide removal can be influenced by the amount of interfacial area. A porous, liquid-gas membrane can provide an advantageously increased interfacial area in a relatively small volume.

An aspect of the disclosure is a method for removing hydrogen sulfide from a liquid stream. The liquid stream comprises an aqueous stream, optionally further comprising hydrocarbon fluids, oil, or the like. The aqueous liquid stream can comprise produced water, for example, from an underground oil or gas producing operation.

In some embodiments, the liquid stream can have a pH of 2 to 9, for example 4 to 7. In some embodiments the pH of the liquid stream is 5.

The liquid stream can be an aqueous stream comprising water and a first amount of hydrogen sulfide, for example the liquid stream can be sour water. As used herein, the term "sour water" refers to water containing hydrogen sulfide in an amount (concentration) greater than 1 part per million (ppm). In some embodiments, the first amount of hydrogen sulfide can be 1 to 30,000 milligrams of hydrogen sulfide per 1 liter of the liquid stream.

The method for removing hydrogen sulfide from a liquid stream comprises contacting the liquid stream with a separation membrane having a first side and a second, opposite side, wherein the liquid stream contacts the first side of the separation membrane. The contacting can occur in any manner, for example the contacting can include conveying the liquid stream past the first side of the membrane. In some embodiments, the contacting can include circulating the liquid stream past the first side of the membrane in a batchwise or continuous manner.

The separation membrane comprises a hydrophobic polymer. For example, the polymeric membrane can comprise a fluoropolymer (e.g., polytetrafluoroethylene, polyvinylidene fluoride, polyhexafluoropropylene, polyvinyl fluoride, and the like), polyetheretherketone, polyvinyl chloride, polyolefins (e.g., polypropylene), polystyrene and polystyrene derivatives, polysulfones, polyethersulfones, and the like, and a combination comprising at least one of the foregoing. In some embodiments, copolymers of any of the above can also be used. In some embodiments, the polymeric membrane is polytetrafluoroethylene (PTFE), polyvinylidene fluoride (PVDF), polyetheretherketone (PEEK), or polypropylene (PP). In some embodiments, the membranes can comprise more than one layer, for example, the membrane can be a multilayer membrane comprising a membrane layer and a support layer. In an embodiment, the support layer can be polypropylene and the membrane layer can be polytetrafluoroethylene.

As mentioned above, the membrane is a porous membrane. Pores, i.e., continuous channels for fluid flow in communication with both first and second sides of the membrane, can be formed in a variety of ways. In some instances the pores can already be part of the materials used to form the membrane. In other instances pores can be created mechanically, electrochemically, or by using other methods generally known for creating pores.

In some embodiments, the porous membrane can have an air permeability of 5 to 100 liters per hour-centimeter$^2$ (L/h-cm$^2$), for example 10 to 50 L/h-cm$^2$. Air permeability can be determined according to ASTM D737. In some embodiments, the porous membrane can have a liquid entry pressure of greater than or equal to 2.5 bar, for example 2.5 to 8 bar, for example 3.5 to 6 bar, as determined according to ASTM D751.

The polymeric membrane can have an average pore diameter of less than or equal to 1 micrometers, for example 0.005 to 1 micrometers, preferably 0.01 to 0.2 micrometers, preferably 0.05 to 0.2 micrometers. The polymeric membranes can have a thickness of 0.05 to 1 millimeter (mm), for example 0.1 to 0.5 mm, for example, 0.1 to 0.35 mm.

The polymeric membranes can have any suitable form that is generally known. For example, in some embodiments, the membrane can be in the form of a flat sheet membrane. In some embodiments, the membrane can be in the form of a hollow fiber membrane.

The hydrophobic polymer membranes generally permit the movement various gases through the membrane, but restrict the flow of water and water-soluble minerals due to the hydrophobic character of the membrane.

The method further comprises contacting a receiving fluid with the second, opposite side of the membrane, where the receiving fluid has a lower concentration of hydrogen sulfide than the liquid stream, thus stripping hydrogen sulfide from the liquid stream by the movement of hydrogen sulfide through the pores of the membrane from the first side to the second, opposite side of the membrane. As used herein, the term "stripping" refers to removing gaseous hydrogen sulfide from a liquid stream, for example water, oil, hydrocarbon liquids, and the like.

In some embodiments, the receiving fluid can be a liquid, for example water. Alternatively, the receiving fluid can be a gas, for example air, nitrogen, methane, natural gas, fuel gas, or a combination comprising at least one of the foregoing. The receiving fluid can be conveyed past the second opposite side of the membrane in a batch-wise or continuous process. The hydrogen sulfide passes through the membrane from the liquid stream to the receiving fluid. Without being bound by theory, the hydrogen sulfide passes through the membrane as a result of the concentration gradient resulting from the high concentration of hydrogen sulfide on the first side of the membrane and the comparatively low concentration of hydrogen sulfide on the second side of the membrane. By conveying fresh receiving fluid past the second side of the membrane, the concentration gradient driving the removal of the hydrogen sulfide from the liquid stream can be maintained. Heat is not needed as a driving force in the method according to the present disclosure. Accordingly, in some embodiments, no external heat is applied to the liquid stream or membrane unit to facilitate passage of hydrogen sulfide through the membrane. In some embodiments, the liquid stream can have a temperature of 1 to 99° C., for example 20 to 85° C. In a preferred embodiment, the temperature of the receiving fluid is equal to the temperature of the liquid stream. In some embodiments, the temperature of the receiving fluid and the liquid stream can be increased. Without being bound by theory, it is believed that increasing the temperature can increase the driving force for the hydrogen sulfide moving through the membrane.

In some embodiments, the pressure of the receiving fluid (gas or liquid) is reduced compared to the feed. Without being bound by theory, the lower pressure in the receiving fluid can aid in the flow of hydrogen sulfide gas through the membrane. This lower pressure can include operating the receiving fluid under vacuum. In some embodiments, the receiving fluid is at a pressure of 25 to 1000 mbar, preferentially 100 to 400 mbar. These values, and all pressure values herein (except differential pressures) are absolute pressure values as opposed to gauge pressure values; for differential pressure values, this distinction is not relevant. In some embodiments, the feed pressure is elevated but only to the extent that it does not exceed the "liquid entry pressure" specified by the membrane manufacturer. The elevation in feed pressure is preferentially less than 1 bar (meaning that the absolute pressure is preferably less than 2 bar, i.e. less than 1 bar above atmospheric pressure)

In absolute terms, it is the pressure difference across the membrane which is believed to be significant. A pressure difference of at least 200 mbar may increase the rate of flow of hydrogen sulfide gas through the membrane. A pressure difference range of 200 to 4,000 mbar may be effective, such as between 300 and 2,000 mbar, for example between 400 and 1,400 mbar.

In general, the rate of permeability of the hydrogen sulfide, i.e., flux through the membrane, is influenced by variables such as the membrane thickness, the permeability constant of the membrane, density, free volume, the physical nature of the membrane, operating pH, the partial pressure differential of the gas across membrane, the operating temperature, the operating pressure and the like. By the removal of hydrogen sulfide from the liquid stream by the passing of hydrogen sulfide through the pores of the membrane, the liquid stream is converted to a reduced-sulfide liquid stream having a second amount of hydrogen sulfide that is less than the first amount of hydrogen sulfide. For example, the second amount of hydrogen sulfide is less than or equal to 5% of the first amount of hydrogen sulfide and, preferably, less than or equal to 1% of the first amount of hydrogen sulfide. In some embodiments, the reduced-sulfide liquid stream has a non-detectable level of hydrogen sulfide.

In some embodiments, the method for removing hydrogen sulfide can be repeated such that the liquid stream is contacted with more than one polymeric membrane to further reduce the hydrogen sulfide content. For example, in some embodiments, the method can optionally include repeating the contacting of the liquid stream with a first side of a porous, gas-liquid separation membrane to provide a reduced-sulfide liquid stream comprising hydrogen sulfide in an amount less than or equal to 10% of the first amount of hydrogen sulfide, preferably less than or equal to 5% of the first amount of hydrogen sulfide, more preferably less than or equal to 1% of the first amount of hydrogen sulfide. Thus, in some embodiments, the method disclosed herein can be a multistage process comprising contacting the liquid stream with two or more membranes. In some embodiments, the membranes are configured in stages with a first stage removing the majority of the hydrogen sulfide (e.g., greater than 50%) and a second stage serving as a "polishing" stage to remove the residual amounts of hydrogen sulfide left in sour water discharged from the first.

In some embodiments, the receiving fluid comprises a liquid (e.g., water) and an additive to convert the hydrogen sulfide into a sulfur-containing reaction product. The sulfur-containing reaction product generally has a composition different from hydrogen sulfide. The process of forming the sulfur-containing reaction product effectively removes hydrogen sulfide from the receiving solution, thus maintaining the concentration gradient, driving the removal of hydrogen sulfide from the liquid stream.

The additive to convert the hydrogen sulfide into a sulfur-containing reaction product can be any compound that is generally known to react with hydrogen sulfide. In some embodiments the additive to convert the hydrogen sulfide comprises an alkali metal hydroxide (e.g., sodium hydroxide, lithium hydroxide, potassium hydroxide, and the like), oxygen, ammonia, a permanganate (e.g., potassium permanganate), a persulfate, sodium nitrite, ozone, hypochlorite (e.g., sodium hypochlorite), chlorite (e.g., sodium chlorite), a peroxide, adducts of peroxide such as perborates and percarbonates, organic amines, or a combination comprising at least one of the foregoing. In an embodiment, the additive comprises a peroxide, an alkali metal hydroxide, an organic amine, or a combination comprising at least one of the foregoing.

In some embodiments, the additive to convert the hydrogen sulfide into a sulfur-containing reaction product can be added to the receiving solution upon entering the membrane unit (i.e., prior to the contacting of the receiving solution with the membrane). In some embodiments, the additive to convert the hydrogen sulfide into a sulfur-containing reaction product can be added to the receiving solution upon exiting the membrane unit (i.e., immediately following the contacting of the receiving solution with the membrane).

In an embodiment, the receiving fluid is an oxidizing solution comprising a peroxide (e.g., hydrogen peroxide), and the sulfur-containing reaction product comprises elemental sulfur. The elemental sulfur can precipitate from the receiving solution, and form a sulfur slurry. In such instances, a solid/liquid separation system can be employed to further separate the precipitated sulfur, and recover the receiving solution. A suitable solid/liquid separation system can comprise, for example, a clarifier, a filter, a centrifuge, a decanter, and the like, or a combination comprising at least one of the foregoing.

In some embodiments, the receiving fluid is a basic aqueous solution comprising, for example, a strong base such as aqueous sodium hydroxide or potassium hydroxide, and the hydrogen sulfide is converted to a sulfur-containing reaction product comprising the corresponding sulfide, i.e., sodium sulfide or potassium sulfide. The sulfur-containing reaction product can therefore be soluble in the receiving solution, for example the sulfur-containing reaction product can be water soluble. When the hydrogen sulfide is converted to a water-soluble form, the sulfur-containing reaction product, for example a sulfate, can be directly discharged for disposal. In some embodiments, when the sulfur-containing reaction product is a water soluble sulfur-containing reaction product, the solution comprising the water soluble sulfur-containing reaction product can be subjected to processes including reverse osmosis, nanofiltration, and the like, or a combination comprising at least one of the foregoing, to concentrate the solution prior to disposal. Concentration of the solution prior to disposal can reduce the amount of receiving solution makeup-water needed.

In some embodiments, the additive is an organic amine reactive with hydrogen sulfide. The organic amine can be, for example, a reaction product of an aldehyde and an amine, including a triazine such as 1,3,5-tris(2-hydroxyethyl)hexahydro-s-triazine, 1,3,5-trimethyl-hexahydro-s-triazine, and the like. The sulfur-containing reaction product can comprise, for example, sodium sulfide, sodium sulfate, thiosulfate, elemental sulfur, a thiadiazine, a dithiazine, a trithiane, or a combination comprising at least one of the foregoing.

In some embodiments, the method further comprises separating the sulfur-containing reaction product from the receiving fluid to form a purified receiving fluid and a sulfur-rich stream. The separating can be by, for example, centrifuging, filtering, decanting, or a combination comprising at least one of the foregoing. Following the recovery of at least a portion of the receiving fluid by separating the sulfur-containing reaction product, the recovered receiving fluid can optionally be recycled to the membrane unit. In some embodiments, additional additive can be added to the recycled receiving solution to replace that which has been reacted.

In some embodiments, it can be desirable to recover the hydrogen sulfide as a vapor as opposed to a precipitated solid, or a dissolved form, as previously discussed. Accordingly, in some embodiments, the receiving fluid can be a sweep gas. Passing a sweep gas across the second side of the membrane can provide a lower the partial pressure of hydrogen sulfide on the second side of the membrane, for example to a level below the partial pressure of hydrogen sulfide on the first side of the membrane. The sweep gas can generally be any suitable inert gas, and can comprise, for example, air, nitrogen, methane, natural gas, fuel gas, and the like or a combination comprising at least one of the foregoing. In some embodiments, the sweep gas can comprise, for example, fuel gas, and the method further comprises converting the hydrogen sulfide vapor to elemental sulfur. The conversion of a hydrogen sulfide vapor to elemental sulfur can take place in a reactor, for example a Claus unit.

In some embodiments, additional gases present in the liquid stream can be removed by the method disclosed herein. For example, ammonia can be removed from the liquid stream. Thus another aspect of the present disclosure is a method for removing ammonia from a liquid stream. The method for removing ammonia from a liquid stream comprises contacting a first side of a porous, gas-liquid separation membrane with a liquid stream comprising a first amount of ammonia; and contacting a second, opposite side of the separation membrane with a receiving fluid having a lower concentration of ammonia than the liquid stream. The ammonia moves through the pores of the membrane from the first side to the second side, to provide a reduced-ammonia liquid stream having a second amount of ammonia that is less than the first amount of ammonia in the liquid stream.

In some embodiments, ammonia can be removed from the liquid stream simultaneously with hydrogen sulfide. When the hydrogen sulfide and the ammonia are removed simultaneously, it is generally preferred that the solution pH is 6 to 8. In some embodiments, the pH of the liquid stream can be adjusted such that ammonia and hydrogen sulfide can be removed in a step-wise process. For example, hydrogen sulfide can be removed preferentially when the pH of the liquid stream is less than 7. For example, ammonia can be removed preferentially when the pH of the liquid stream is greater than 9.

The method can optionally comprise pretreating the stream prior to contacting the separation membrane. Pretreating the liquid stream can comprise, for example, pressurizing the liquid stream, softening, heating, adjusting the pH, a chemical treatment, filtering, or a combination comprising at least one of the foregoing. Pretreating the liquid stream comprising the hydrogen sulfide can advantageously improve the flux of hydrogen sulfide across the membrane, and reduce membrane-related problems. For example, pressurizing the liquid stream, followed by addition of air, nitrogen, or another gas to the stream while under pressure can increase the rate at which hydrogen sulfide passes through the membrane if the pressure is released at the inlet to the membrane unit. In another embodiment, by pretreating to remove particulate contaminants (e.g., by filtering, centrifuging, and the like), the lifetime of the membrane can be extended, and the overall system performance can be improved.

Figure 2:
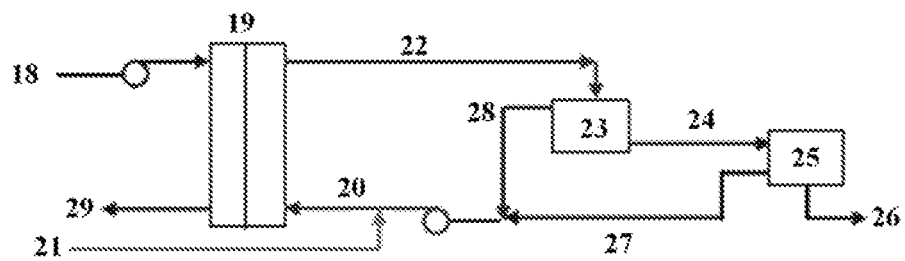
FIG. 2 shows a schematic representation of a system for removal of hydrogen sulfide from sour water according to the presently disclosed method using a hydrophobic membrane unit.

In some embodiments, the method for removal of hydrogen sulfide from a liquid stream can be carried out according to the process depicted in FIG. 2. A liquid stream comprising sour water (18) is contacted with a hydrophobic membrane unit (19). Hydrogen sulfide can pass through the membrane into a receiving solution (22), where the hydrogen sulfide is removed by reacting with a chemical additive (21) in the receiving solution. As shown in FIG. 2, the additive can be added prior to entry of the receiving solution to the membrane unit. After contacting the membrane, a reduced-sulfide liquid stream (29) is provided. The receiving solution having the sulfur-containing reaction product can be, in some embodiments, transported to a solid/liquid separation system comprising, for example, a clarifier (23) and a filter press (25). After passage through the clarifier, the sulfur slurry (24) is transferred to the filter press (25), while the supernatant (28) is recycled back into the receiving solution supply (20). Following passage through the filter press, the filtrate (27) is also recycled into the receiving solution supply (20), and the sulfur-containing filter cake (26) is removed.

Figure 3:
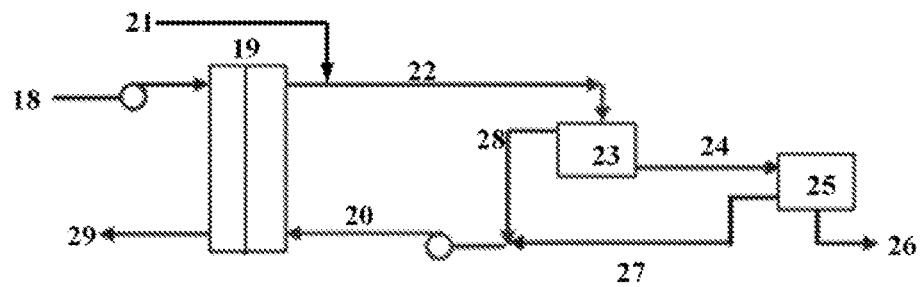
FIG. 3 shows a schematic representation of a system for removal of hydrogen sulfide from sour water according to the presently disclosed method using a hydrophobic membrane unit.

The method for removal of hydrogen sulfide from a liquid stream can also be accomplished according to the process depicted in FIG. 3. FIG. 3 illustrates alternatively adding the chemical additive (21) upon exit of the receiving solution from the membrane unit.

Figure 4:
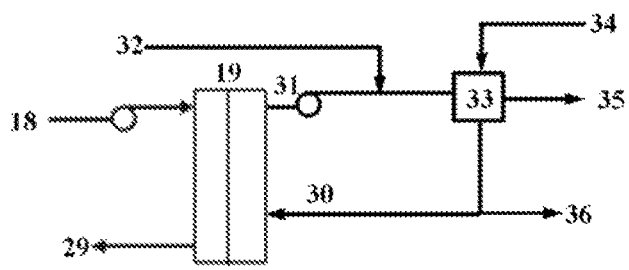
FIG. 4 shows a schematic representation of a system for removal of hydrogen sulfide from sour water according to the presently disclosed method using a hydrophobic membrane unit and a sweep gas receiving fluid.

In another embodiment, the method for removal of hydrogen sulfide from a liquid stream can be carried out according to the process depicted in FIG. 4. A liquid stream comprising sour water (18) is contacted with a hydrophobic membrane unit (19). Hydrogen sulfide can pass through the membrane into a receiving fluid comprising sweet gas (30). "Sweet gas" refers to a fuel gas that is low in hydrogen sulfide, for example has a concentration of hydrogen sulfide that is lower than the concentration of hydrogen sulfide in the liquid stream. Upon contacting the hydrogen sulfide that has passed through the membrane, the sweet gas is converted to a sour gas feed (31) comprising the hydrogen sulfide, which exits the membrane unit. This sour gas feed (31) can optionally be combined with a sour gas feed (32) which is recovered directly from a sour gas well. The sour gas feed enters an amine treating unit (33), where a lean amine solution (34) is added to provide a rich amine stream (35). The rich amine stream (35) is high in hydrogen sulfide content, and is transferred to an amine regeneration system to recover the lean amine stream that can be recycled to the amine treating unit. Also recovered from amine treating unit (33) is a sweet gas stream which can be, at least in part, recycled to the membrane unit and removed for further processing as sweet gas stream (36).

The inventors hereof have thus provided an improved method for removing hydrogen sulfide from sour water. The method disclosed herein has applications through the oil and gas industry worldwide, as well as in other applications including municipal water treatment. The disclosed method can advantageously convert hydrogen sulfide into a non-hazardous aqueous or solid form in a single step. No heating or cooling is required, allowing for minimal external energy to be expended. Alternatively, if desired, the hydrogen sulfide can be removed in vapor form. Furthermore, ambient temperature operation permits the use of plastic materials in the construction of a system for carrying out the method. Additionally, the disclosed method can remove other gases (e.g., ammonia) and/or volatile hydrocarbons from a liquid feed. Advantageously, the present disclosure provides a method wherein the reduced-sulfide liquid stream can optionally be directly disposed of by discharging to the environment.

The invention is further described by the following non-limiting examples.

EXAMPLES

Example 1

A sour water feed solution containing 20 milligrams per liter hydrogen sulfide was contacted with a PTFE membrane having an average pore size of 0.2 micrometers and an active area of 0.014 square meters. A receiving solution containing aqueous sodium hydroxide at a concentration of 4 grams per liter was used. The hydrogen sulfide content of the water was reduced to less than 0.5 milligrams per liter hydrogen sulfide using the method for removing hydrogen sulfide disclosed herein. This represents a greater than 97.5% sulfide removal using the presently disclosed method.

Example 2

This example demonstrates the effect of pH on the rate of hydrogen sulfide removal. The membrane unit used for this Example included a membrane cell comprising a PTFE membrane, a reservoir for the liquid stream comprising hydrogen sulfide, a reservoir for the receiving solution comprising sodium hydroxide, and a pump for each solution. The reservoirs were sealed (with a very small vent) and the headspace was minimized to avoid losses of $H_2S$. To keep the pH constant at the desired value, a dosing pump was set to deliver small amount of hydrochloric acid into the feed reservoir based on the pH readings. The membrane used in this experiment was an MD PTFE membrane with an average pore size of 0.2 μm and an active area of 0.014 $m^2$.

A feed solution was prepared using sodium sulfide ($Na_2S$). The initial pH of the $Na_2S$ solution was 10.8 and the initial sulfide concentration was approximate 20 mg/L. The receiving solution used in the experiments was 0.1N NaOH. The two solutions were recirculated through the membrane cell at a constant flow rate (approximate 1-1.5 L/min). The amount of sulfide ($S^{2-}$) was measured using the USEPA Methylene Blue Method Number 8131 using a kit obtained from Hach Company.

Figure 5:
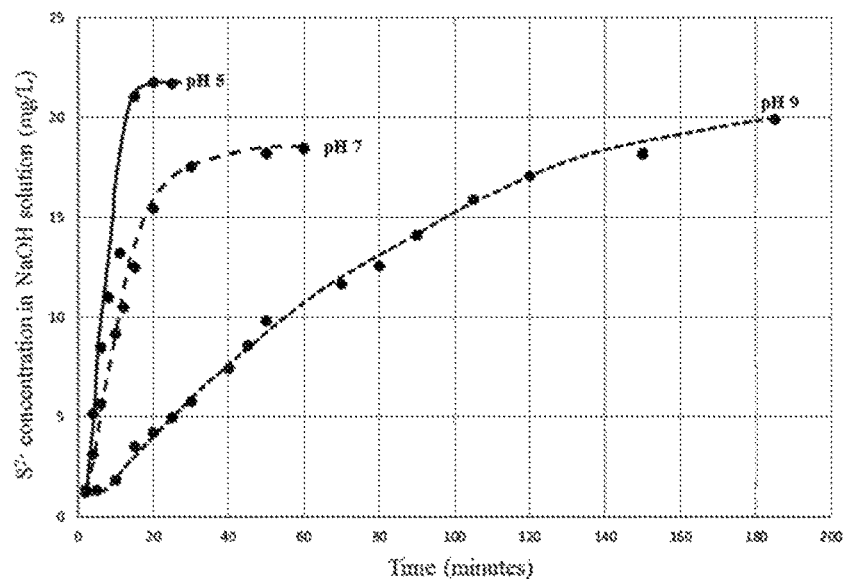
FIG. 5 shows sulfide concentration in the receiving solution as a function of time and pH.

Experimental results confirmed that the sulfide removal rate is pH dependent and it is faster at lower pH. At pH 5, the initial rate of removal was 8,000 $mg/(m^2-h)$; at pH 7 and 9, the rate of removal was 4,000 $mg/(m^2-h)$ and 800 $mg/(m^2-h)$; respectively. The faster removal rate at low pH is due to the $H_2S$ distribution/concentration in solution. FIG. 5 shows the sulfide concentration in the receiving solution as a function of time and pH. At the end of each experiment, the sulfide concentration in the feed was less than 0.5 mg/L.

The results indicate that (1) sulfide can be removed from a liquid stream using a hydrophobic membrane, and (2) the removal rate is pH dependent with faster rates achieved at lower pH.

Example 3

This example demonstrates the effect of placing the downstream side of the membrane under vacuum. The membrane unit used for this Example included a membrane cell comprising a PTFE membrane as described in Example 1. In addition, a reservoir for the aqueous feed stream and a feed pump for recirculating this feed across the membrane were provided. The feed stream for this experiment was actual wastewater (sour water) from a natural gas processing facility and contained 85 mg/L of sulfide ($S^{2-}$). The feed pressure was about 1050 mbar. On the downstream side of the membrane, a vacuum pump and a sealed reservoir containing receiving solution were provided. The reservoir included a gas diffuser and a probe for measuring sulfide concentration. The receiving solution was 1 M sodium hydroxide (NaOH).

The downstream side of the membrane cell had two process connections: i) an air inlet with manual air flow control valve, and ii) an air outlet connected, through tubing, to a gas diffuser submerged in the receiving solution. The headspace in the receiving reservoir was connected via separate tubing to the suction side of the vacuum pump. When the vacuum pump was turned on, it created a vacuum in the headspace of the receiving reservoir. This vacuum in turn created a vacuum in the downstream side of the membrane resulting in air being drawn into the membrane cell through the air inlet connection. The air drawn in under vacuum served as the "sweep gas" carrying $H_2S$ away from the membrane. The hydrogen sulfide rich air stream bubbled up through the receiving solution and the hydrogen sulfide was converted to sodium sulfide.

Figure 6:
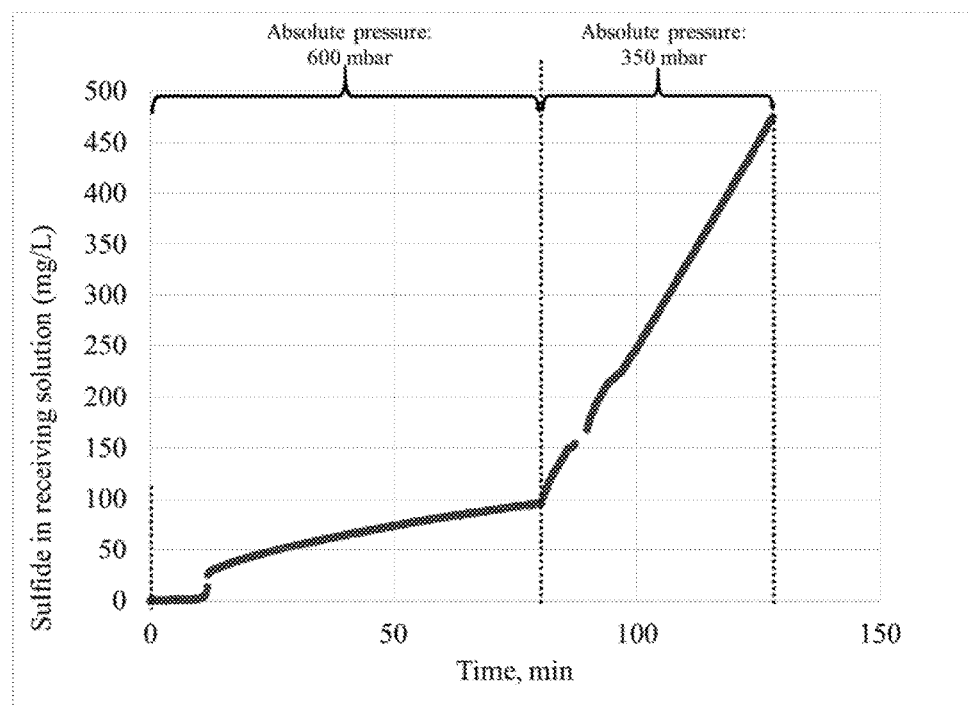
FIG. 6 shows sulfide concentration in the receiving solution as a function of time and absolute pressure.

The test was conducted initially with the downstream side at 600 mbar pressure representing a 450 mbar pressure differential. After 80 minutes, the air inlet valve was adjusted until the downstream pressure was reduced to 350 mbar (700 mbar pressure differential) and the system was operated at this pressure for an additional 48 minutes. The sulfide concentration in the receiving solution was continuously measured and is plotted in FIG. 6. The slope of the $H_2S$ concentration vs. time line reflects the rate at which $H_2S$ travelled through the membrane.

Experimental results showed that at a 700 mbar pressure differential, the rate of $H_2S$ flow through the membrane was approximately 8.5×higher than operating with a pressure differential of 450 mbar.

In general, the invention may alternately comprise, consist of, or consist essentially of, any appropriate components herein disclosed. The invention may additionally, or alternatively, be formulated so as to be devoid, or substantially free, of any components, materials, ingredients, adjuvants or species used in the prior art compositions or that are otherwise not necessary to the achievement of the function and/or objectives of the present invention.

All ranges disclosed herein are inclusive of the endpoints, and the endpoints are independently combinable with each other. "Combination" is inclusive of blends, mixtures, alloys, reaction products, and the like. Furthermore, the terms "first," "second," and the like, herein do not denote any order, quantity, or importance, but rather are used to denote one element from another. The terms "a" and "an" and "the" herein do not denote a limitation of quantity, and are to be construed to cover both the singular and the plural, unless otherwise indicated herein or clearly contradicted by context. "Or" means "and/or." Reference throughout the specification to "one embodiment," "another embodiment," "an embodiment," and so forth, means that a particular element described in connection with the embodiment is included in at least one embodiment described herein, and may or may not be present in other embodiments. In addition, it is to be understood that the described elements may be combined in any suitable manner in the various embodiments.

While the invention has been described in detail in connection with only a limited number of embodiments, it should be readily understood that the invention is not limited to such disclosed embodiments. Rather, the invention can be modified to incorporate any number of variations, alterations, substitutions, or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A method for removing hydrogen sulfide from a liquid stream comprising produced water from an underground oil or gas producing operation, the method comprising:
   contacting a first side of a porous, gas-liquid separation membrane with a liquid stream comprising a first amount of hydrogen sulfide; and
   contacting a second, opposite side of the separation membrane with a receiving fluid having a lower concentration of hydrogen sulfide than the liquid stream, wherein the hydrogen sulfide moves through the pores of the membrane from the first side to the second side, to provide a reduced-sulfide liquid stream having a second amount of hydrogen sulfide that is less than the first amount of hydrogen sulfide in the liquid stream, wherein the receiving fluid comprises water and an organic amine reactive with hydrogen sulfide.

2. The method of claim 1, wherein the second amount of hydrogen sulfide is less than or equal to 10% of the first amount of hydrogen sulfide.

3. The method of claim 1, wherein the first amount of hydrogen sulfide is 1 to 30,000 milligrams of hydrogen sulfide per 1 liter of the liquid stream.

4. The method of any of claim 1, where the liquid stream has a pH of 2 to 9.

5. The method of any of claim 1, wherein the membrane is a hydrophobic polymeric membrane comprising polytetrafluoroethylene, polyvinylidene fluoride, polypropylene, polyetheretherketone, or a combination comprising at least one of the foregoing.

6. The method of any of claim 1, wherein the pores of the membrane are 0.005 to 1 micrometers.

7. The method of any of claim 1 further comprising separating a sulfur-containing reaction product from the receiving solution to form a purified receiving fluid and a sulfur-rich stream.

8. The method of claim 7, further comprising recycling the purified receiving fluid.

9. The method of any of claim 1, further comprising pretreating the liquid stream prior to contacting the separation membrane, wherein the pretreating comprises pressurizing the liquid stream, softening, heating, adjusting the pH, a chemical treatment, filtering, or a combination comprising at least one of the foregoing.

10. The method of any of claim 1, wherein
   the liquid stream further comprises ammonia;
   the ammonia moves through the pores of the membrane from the first side to the second, opposite side of the membrane;
   the receiving fluid receives the ammonia; and
   the reduced-sulfide liquid stream further comprises a second amount of ammonia that is less than the first amount of ammonia.

11. The method of any of claim 1 wherein a pressure differential is maintained across the membrane whereby the said second side is at a lower pressure than the said first side.

12. The method of claim 11 wherein the pressure differential is at least 200 mbar.

13. The method of claim 12 wherein the pressure differential is between 300 and 2,000 mbar.

14. The method of claim 13 wherein the pressure differential is between 400 and 1,400 mbar.

15. The method of any of claim 1 wherein the pressure on said second side of the membrane is maintained below atmospheric pressure.

16. The method of claim 15 wherein air is drawn through the receiving fluid thereby stripping hydrogen sulfide from the receiving fluid whilst also maintaining pressure below atmospheric pressure on said second side of the membrane.

* * * * *